(12) United States Patent
Noda et al.

(10) Patent No.: US 9,109,094 B2
(45) Date of Patent: Aug. 18, 2015

(54) HIGHLY ADHESIVE POLYESTER FILM AND PACKAGING MATERIAL USING THE SAME

(75) Inventors: Atsuko Noda, Kyoto (JP); Takayoshi Okuzu, Kyoto (JP); Hideki Kuwata, Kyoto (JP); Kiwamu Yuki, Kyoto (JP)

(73) Assignee: Unitika, Ltd., Hyogo (JP)

( * ) Notice: Subject to any disclaimer, the term of this patent is extended or adjusted under 35 U.S.C. 154(b) by 627 days.

(21) Appl. No.: 12/999,535

(22) PCT Filed: Jun. 25, 2009

(86) PCT No.: PCT/JP2009/002909
§ 371 (c)(1),
(2), (4) Date: Dec. 16, 2010

(87) PCT Pub. No.: WO2009/157199
PCT Pub. Date: Dec. 30, 2009

(65) Prior Publication Data
US 2011/0081512 A1   Apr. 7, 2011

(30) Foreign Application Priority Data

Jun. 27, 2008 (JP) ................................. 2008-168795

(51) Int. Cl.
| | |
|---|---|
| *B32B 1/02* | (2006.01) |
| *B32B 27/26* | (2006.01) |
| *B32B 27/36* | (2006.01) |
| *C08J 7/04* | (2006.01) |
| *C09J 7/02* | (2006.01) |

(52) U.S. Cl.
CPC .................. *C08J 7/047* (2013.01); *B32B 27/36* (2013.01); *C09J 7/0285* (2013.01); *B32B 27/26* (2013.01); *C08J 2367/02* (2013.01); *C08J 2467/00* (2013.01); *C09J 2467/006* (2013.01); *Y10T 428/1352* (2015.01); *Y10T 428/2848* (2015.01); *Y10T 428/2852* (2015.01)

(58) Field of Classification Search
CPC ......... C08L 67/02; B32B 27/26; B32B 27/36; Y10T 428/1352; Y10T 428/2843; Y10T 428/2852; Y10T 428/31786; Y10T 428/31794
USPC ........... 428/34.1, 355 R, 480, 482, 35.7, 353; 156/332; 525/337, 444
See application file for complete search history.

(56) References Cited

U.S. PATENT DOCUMENTS

| | | | | |
|---|---|---|---|---|
| 5,626,947 A | * | 5/1997 | Hauer et al. ............... | 428/195.1 |
| 6,156,441 A | * | 12/2000 | Hamada et al. .............. | 428/480 |
| 2005/0112391 A1 | * | 5/2005 | Schmid et al. ............... | 428/480 |
| 2005/0250914 A1 | * | 11/2005 | Stumbe et al. ............... | 525/437 |
| 2008/0008831 A1 | * | 1/2008 | Kishimoto et al. ......... | 427/208.2 |
| 2009/0203871 A1 | * | 8/2009 | Maruyama et al. .......... | 528/303 |
| 2010/0136328 A1 | * | 6/2010 | Okuzu et al. ................. | 428/336 |

FOREIGN PATENT DOCUMENTS

| | | |
|---|---|---|
| EP | 0731130 | 9/1996 |
| JP | 2000-327991 | 11/2000 |
| JP | 2002-80705 | 3/2002 |
| WO | 2008/099595 | 8/2008 |
| WO | WO 2008099595 A1 * | 8/2008 |

OTHER PUBLICATIONS

Bishop, Charles A., Tullo, Gregory, "How items such as dust, oligomers & slip agents can affect the polymer film surface quality and be potential problems in high-tech roll-to-roll vacuum deposition applications," Society of Vacuum Coaters, 2006. (http://www.cabuk1.co.uk/SVC%202006%20-%20Polymer%20film%20surface%20quality.pdf).*
Supplementary European Search Report in EP 09769909.4 dated Feb. 26, 2013.
Database WPI Week 200245 Thomson Scientific XP002692105 Mar. 19, 2002.
Database WPI Week 200851 Thomson Scientific XP002692106 Jun. 12, 2008.
Database WPI Week 200118 Thomson Scientific XP002692107 Nov. 28, 2000.

* cited by examiner

*Primary Examiner* — Walter B Aughenbaugh
(74) *Attorney, Agent, or Firm* — Fildes & Outland, P.C.

(57) ABSTRACT

Disclosed is a highly adhesive polyester film having a highly adhesive primer layer disposed on at least one side of a substrate polyester film. The substrate polyester film is a stretched film having linear tearability and formed of a mixed polyester resin containing polyethylene terephthalate and a modified polybutylene terephthalate, and the highly adhesive primer layer contains a polyester resin (A) having an acid number of 20 to 60 mg KOH/g and a hydroxyl number of 30 to 150 mg KOH/g, and having an oligomer content of 2.0% by mass or less, and substantially contains no crosslinking agent component.

13 Claims, 1 Drawing Sheet

HIGHLY ADHESIVE POLYESTER FILM AND PACKAGING MATERIAL USING THE SAME

TECHNICAL FIELD

The present invention relates to a highly adhesive polyester film and a packaging material using the same, in particular, a highly adhesive polyester film usable for materials such as a packaging material and a packaging material using the same.

BACKGROUND ART

Packaging materials comprising biaxially stretched polyester films excellent in heat resistance, mechanical strength, impact resistance and oil resistance are used for packaging food to be subjected to a heat sterilization treatment such as a boiling treatment or a retorting treatment. Examples of the packaging configurations of such packaging materials include: PET/CPP, PET/ON/CPP, PET/Al/CPP, PET/Al/ON/CPP and PET/ON/Al/CPP, wherein PET, Al, CPP and ON stand for polyethylene terephthalate, aluminum foil, unstretched polypropylene film and biaxially stretched nylon film, respectively.

Such packaging materials are required to be linearly tearable (hereinafter, being linearly tearable is referred to as "linear tearability" as the case may be) when the packages are opened. However, in the case where packaging bags are formed of heretofore known packaging materials using common biaxially stretched polyester films, when such packaging bags are opened, the packaging bags are not linearly torn and consequently the contents of the packaging bags are scattered or other troubles occur as the case may be.

As a technique to solve such problems, JP2002-080705A discloses a highly adhesive film having a highly adhesive layer disposed on a biaxially stretched film in which a modified polybutylene terephthalate (modified PBT) containing polybutylene terephthalate (PBT) and polytetramethylene glycol (PTMG) is mixed with PET. When a packaging material is prepared from such a highly adhesive film, the laminate strength and the linear tearability of the packaging material can be improved.

Additionally, in a heretofore known technique, a polyester resin is used in the highly adhesive layer of a polyester film. For the purpose of improving the heat resistance and the adhesiveness of the highly adhesive layer, a crosslinking agent such as melamine is added to the polyester resin constituting the highly adhesive layer (for example, JP08-311221A, paragraph 0057).

However, it has been revealed that in a laminated film including as a substrate a film having linear tearability, when the laminate strength after a boiling treatment or a retorting treatment is degraded and consequently the delamination tends to occur, unfortunately the linear tearability intrinsically belonging to the substrate film is not sufficiently displayed and the linear tearability is degraded in the laminated film.

On the other hand, formaldehyde is generated from the melamine resin used as the crosslinking agent, and formaldehyde is known to cause sick house syndrome or sick school syndrome. In the packaging industries, there is a trend to reduce the addition of melamine resin for the purpose of improving the work environment at the time of manufacturing products and other purposes. However, it has been revealed that the laminate strength is insufficient without melamine resin, when boiling treatment or retorting treatment is conducted under the more severe conditions recently required for the packaging materials.

SUMMARY OF INVENTION

Technical Problem

The present invention intends to solve the technical problems involved in the above-described problems of the heretofore known techniques. Specifically, the present invention intends to provide a highly adhesive polyester film capable of maintaining practically sufficient laminate adhesiveness even after the application of a boiling treatment or a retorting treatment under the conditions more severe than before and additionally free from impairing the linear tearability belonging to the biaxially stretched polyester film having a specific composition even after the above-described treatment, and to provide a packaging material using the highly adhesive polyester film.

Solution To Problem

For the purpose of solving the above-described problems, the present inventors made a diligent study, and consequently have reached the present invention by discovering that the above-described problems can be solved by disposing as a highly adhesive primer layer a layer formed of a specific polyester resin on at least one side of a biaxially stretched polyester film made to develop the linear tearability by mixing a specific polyester resin with polyethylene terephthalate.

Specifically, the gist of the present invention is as follows.

(1) A highly adhesive polyester film having a highly adhesive primer layer disposed on at least one side of a substrate polyester film, wherein: the substrate polyester film is a stretched film having linear tearability and formed of a mixed polyester resin containing polyethylene terephthalate and a modified polybutylene terephthalate; and the highly adhesive primer layer contains a polyester resin (A) having an acid number of 20 to 60 mg KOH/g, a hydroxyl number of 30 to 150 mg KOH/g and an oligomer content of 2.0% by mass or less, and substantially contains no crosslinking agent component.

(2) The highly adhesive polyester film according to (1), wherein in the polyester resin (A), the sum of the acid number and the hydroxyl number is 50 to 200 mg KOH/g.

(3) The highly adhesive polyester film according to (1) or (2), wherein in the polyester resin (A), the ratio of the hydroxyl number to the acid number, (hydroxyl number)/(acid number), is 2.0 to 5.0.

(4) The highly adhesive polyester film according to any one of (1) to (3), wherein in the highly adhesive primer layer, the surface carboxylic acid concentration and the surface hydroxyl concentration are each 0.005 or more, and the surface primary amine concentration is 0.0001 or less.

(5) The highly adhesive polyester film according to any one of (1) to (4), wherein the highly adhesive polyester film substantially contains no melamine compound as the crosslinking agent component.

(6) The highly adhesive polyester film according to any one of (1) to (5), wherein the modified polybutylene terephthalate in the substrate film contains polybutylene terephthalate and polytetramethylene glycol.

(7) A method for producing a highly adhesive polyester film, the method being a method for producing the highly adhesive polyester film according to any one of (1) to (6), wherein a coating layer is formed by applying an aqueous coating material mainly composed of the polyester resin (A)

to at least one side of the substrate polyester film before orientational crystallization, and then the substrate polyester film is orientationally crystallized by stretching in at least one direction and heat treating the substrate polyester film together with the coating layer.

(8) The method for producing a highly adhesive polyester film according to (7), wherein an oligomer removal treatment is performed.

(9) A laminated film including the highly adhesive polyester film according to any one of (1) to (6).

(10) The laminated film according to (9), wherein the highly adhesive polyester film and another layer are made to adhere to each other through the intermediary of a polyurethane adhesive.

(11) The laminated film according to (9) or (10), wherein the laminate strength of the laminated film after a retorting treatment at 135° C. for 30 minutes is 200 g/15 mm width or more under either ordinary condition or water-wetted condition.

(12) A packaging bag wherein the bag is made of the laminated film according to any one of (9) to (11).

(13) The packaging bag according to (12), wherein the bag is made in such a way that the linear tearing direction of the laminated film coincides with the opening direction of the bag.

Advantageous Effects of Invention

According to the highly adhesive polyester film of the present invention, it is possible to constitute a laminated film having a practically sufficient laminate adhesiveness even after a boiling treatment or a retorting treatment is applied under the conditions more severe than before.

The highly adhesive polyester film of the present invention is free from impairing the excellent linear tearability belonging to the substrate film and is at the same time provided with an appropriate tear resistance.

When a bag is made so as for the linear tearing direction thereof to coincide with the opening direction thereof by using the laminated film constituted with the highly adhesive polyester film of the present invention, it is possible to obtain a conveniently openable packaging bag. Such a packaging bag is particularly suitable for applications to food packaging.

The highly adhesive polyester film of the present invention is obtained without using as a crosslinking agent a formaldehyde-generating substance such as a melamine compound, and accordingly can improve the surrounding environment, in particular, the work environment at the time of producing packaging materials.

The highly adhesive polyester film of the present invention can be produced in an easy and simple manner by applying an aqueous coating material containing a polyester resin to a substrate film. The coating material is aqueous and hence is environment-friendly, and at the same time, is easy in controlling the thickness of the highly adhesive primer layer and is accordingly excellent in productivity so as to be industrially advantageous.

DESCRIPTION OF EMBODIMENTS

Hereinafter, the present invention is described in detail.
In the highly adhesive polyester film of the present invention, a highly adhesive primer layer is disposed on at least one side of a substrate polyester film.

The substrate polyester film is a film having a linear tearability, and examples of such a film include a film having the same configuration as described in above-described JP2002-080705A. Hereinafter, the details of the substrate polyester film are described.

The substrate polyester film can preferably use a biaxially stretched film which uses a mixed polyester resin containing 70 to 95% by mass of polyethylene terephthalate (PET) and 30 to 5% by mass of a modified polybutylene terephthalate (modified PBT) containing polybutylene terephthalate (PBT) and polytetramethylene glycol (PTMG). The biaxially stretched film having such a resin composition is known to develop the linear tearability in the film flow direction (MD direction) at the time of production, as described in JP2002-080705A.

The mixing ratio between PET and the modified PBT, PET/modified PBT is required to be 70/30 to 95/5 (mass ratio), preferably 80/20 to 90/10 (mass ratio) and more preferably 85/15 to 90/10 (mass ratio). When the mixing proportion of the modified PBT is less than 5% by mass, no linear tearability is obtained, and when the mixing proportion of the modified PBT exceeds 30% by mass, the performances such as the mechanical strength, the dimensional stability and the haze are degraded and problems occur with respect to practical applications.

The ratio between PBT and PTMG in the modified PBT, PBT/PTMG is preferably 70/30 to 95/5 (mass ratio) and more preferably 80/20 to 90/10 (mass ratio) because the compatibility between the modified PBT and PET is made satisfactory and the extrusion workability of the film is improved.

The modified PBT can be obtained through condensation polymerization by adding PTMG in the polymerization process of PBT. In a simpler manner, the modified PBT can be obtained by melt-kneading PBT and PTMG.

The molecular weight of PTMG is preferably 600 to 4,000, more preferably 2,000 to 3,000. When the molecular weight is less than 600, it is difficult to obtain the linear tearability, and when the molecular weight exceeds 4,000, the performances such as the mechanical strength, the dimensional stability and the haze tend to be degraded, and the linear tearability of the film is not stabilized as the case may be.

PET and PBT produced in the usual manner can be used. For example, PET can be obtained as follows: a polyester oligomer (bishydroxyethyl terephthalate) is synthesized by means of a method such as a method of direct esterification from terephthalic acid and ethylene glycol or a method of transesterification of dimethyl terephthalate with ethylene glycol; then the polyester oligomer is subjected to melt condensation polymerization to yield PET.

In addition to the terephthalic acid component, other acid components may be added as long as the advantageous effects of the present invention are not impaired. Examples of the other acid components as referred to herein include: alicyclic dicarboxylic acids such as isophthalic acid, orthophthalic acid, naphthalene dicarboxylic acid, biphenyldicarboxylic acid, oxalic acid, succinic acid, succinic anhydride, adipic acid, azelaic acid, sebacic acid, fumaric acid, maleic acid, maleic anhydride, itaconic acid, itaconic anhydride, citraconic acid, citraconic anhydride, dimer acid, 1,4-cyclohexanedicarboxylic acid, 1,3-cyclohexanedicarboxylic acid, 1,2-cyclohexanedicarboxylic acid, 2,5-norbornenedicarboxylic acid and the anhydride thereof, and tetrahydrophthalic acid and the anhydride thereof; and trimellitic acid, pyromellitic acid, benzophenonetetracarboxylic acid, trimellitic anhydride, pyromellitic anhydride, benzophenonetetracarboxylic anhydride, trimesic acid, ethylene glycol bis(anhydrotrimellitate), glycerol tris(anhydrotrimellitate) and 1,2,3,4-butanetetracarboxylic acid.

In addition to the ethylene glycol component or 1,4-butanediol as the alcohol component of PET or PBT, respectively, other alcohol components may be used as long as the advantageous effects of the present invention are not impaired. Examples of the other alcohol components as referred to herein include: 1,2-propanediol, 1,3-propanediol, 1,4-butanediol, 2-methyl-1,3-propanediol, 1,5-pentanediol, neopentylglycol, 1,6-hexanediol, 3-methyl-1,5-pentanediol, 1,9-nonanediol, 2-ethyl-2-butylpropanediol, 1,4-cyclohexanedimethanol, diethylene glycol, triethylene glycol, dipropylene glycol, glycols obtained by adding one to a few moles of ethylene oxide or propylene oxide respectively to the two phenolic hydroxyl groups of the bisphenols such as 2,2-bis(4-hydroxyethoxyphenyl)propane, polyethylene glycol, polypropylene glycol, polytetramethylene glycol, glycerin, trimethylolethane, trimethylolpropane and pentaerythritol.

With the substrate polyester film, other polymers such as polyethylene naphthalate and polycyclohexylenedimethylene terephthalate can be mixed as long as the advantageous effects of the present invention are not impaired. Additionally, the substrate polyester film may contain in appropriate amounts, where necessary, additives such as an ultraviolet absorber, an antioxidant, an antistatic agent, a surfactant, a pigment and a fluorescent whitening agent; inorganic particles such as particles of silica, calcium carbonate and titanium oxide; and organic particles mainly composed of the constituent components such as acryl and styrene.

The polyester resin (A) constituting the highly adhesive primer layer in the present invention is constituted with the repeating units of an acid component and an alcohol component, and produced with heretofore known methods. The polyester resin (A) may be a resin using only one type of polyester resin or two or more types of polyester resins in combination. For the purpose of applying the production method of the present invention, the polyester resins are required to be capable of being compatibilized with water.

Examples of the dicarboxylic acids as the acid component of the polyester resin (A) may include: aromatic dicarboxylic acids such as terephthalic acid, isophthalic acid, orthophthalic acid, naphthalenedicarboxylic acid and biphenyldicarboxylic acid; saturated and unsaturated aliphatic dicarboxylic acids such as oxalic acid, succinic acid, succinic anhydride, adipic acid, azelaic acid, sebacic acid, fumaric acid, maleic acid, maleic anhydride, itaconic acid, itaconic anhydride, citraconic acid, citraconic anhydride and dimer acid; and alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid and the anhydride thereof, and tetrahydrophthalic acid and the anhydride thereof.

It is preferable to use a trifunctional or higher carboxylic acid as the acid component of the polyester resin (A). Examples of such a carboxylic acid include trimellitic acid, pyromellitic acid, benzophenonetetracarboxylic acid, trimellitic anhydride, pyromellitic anhydride, benzophenonetetracarboxylic anhydride, trimesic acid, ethylene glycol bis(anhydrotrimellitate), glycerol tris(anhydrotrimellitate) and 1,2,3,4-butanetetracarboxylic acid. Among these, trimellitic acid is preferable from the viewpoints of the adhesiveness of the coating layer, the water dispersibility and the heat resistance.

The proportion of the trifunctional or higher polybasic acid in the acid component is preferably 5 to 50 mol %, more preferably 10 to 40 mol % and particularly preferably 15 to 30 mol %, for the purpose of satisfactorily maintaining the water dispersibility of the resin and setting the acid number of the polyester resin and the surface carboxylic acid concentration of the coating layer respectively at the values intended by the present invention.

It is preferable to use the aromatic carboxylic acids among the acid components. The proportion of the aromatic carboxylic acid in the polybasic acid component of the polyester resin is preferably 40 mol % or more, more preferably 50 mol % or more, furthermore preferably 60 mol % or more and particularly preferably 70 mol % or more. By increasing the proportion of the aromatic carboxylic acid component, the proportion of the aromatic ester bond more resistant to hydrolysis than the aliphatic and alicyclic ester bonds is increased in the resin skeleton, and hence the storage stability of the resin aqueous dispersion and the water resistance of the resin coating layer constituting the obtained highly adhesive primer layer are improved, and at the same time, the workability and the solvent resistance of the resin coating layer are also improved.

Among the above-described aromatic carboxylic acids, terephthalic acid, isophthalic acid and naphthalenedicarboxylic acid are preferable because these acids can improve the properties of the resin coating layer constituting the highly adhesive primer layer such as the workability, the hardness, the hot water resistance, the solvent resistance and the weather resistance while the balance between these properties and the various performances of the resin coating layer.

For the purpose of enhancing the water dispersibility of the polyester resin (A), a sulfo group-containing component such as 5-sodium sulfoisophthalate can also be added as a copolymerization component. However, such addition frequently degrades the water resistance of the resin coating layer and frequently significantly impairs the adhesiveness, intended by the present invention, after hot water treatment such as boiling treatment or retorting treatment, and hence it is preferable to avoid such addition if possible.

Examples of the diols as the alcohol component of the polyester resin (A) include: ethylene glycol, 1,2-propanediol, 1,3-propanediol, 1,4-propanediol, 2-methyl-1,3-propanediol, 1,5-pentanediol, neopentylglycol, 1,6-hexanediol, 3-methyl-1,5-pentanediol, 1,9-nonanediol, 2-ethyl-2-butylpropanediol, 1,4-cyclohexanedimethanol, diethylene glycol, triethylene glycol, dipropylene glycol, glycols obtained by adding one to a few moles of ethylene oxide or propylene oxide respectively to the two phenolic hydroxyl groups of the bisphenols such as 2,2-bis(4-hydroxyethoxyphenyl)propane, polyethylene glycol, polypropylene glycol and polytetramethylene glycol.

Examples of the trifunctional or higher alcohols as the alcohol component of the polyester resin (A) may include glycerin, trimethylolethane, trimethylolpropane and pentaerythritol.

Among the above-described alcohol components, ethylene glycol, 1,4-butanediol and neopentylglycol are particularly preferable. The total proportion of ethylene glycol, 1,4-butanediol and neopentylglycol in the alcohol component of the polyester resin (A) is preferably 50 mol % or more, more preferably 60 mol % or more and particularly preferably 70 mol % or more. Ethylene glycol, 1,4-butanediol and neopentylglycol are industrially mass-produced and hence are low in price, and additionally provide a balance between the properties of the resin coating layer. These polyhydric alcohols particularly improve the chemical resistance and the weather resistance of the resin coating layer.

The acid number of the polyester resin (A) is required to be 20 to 60 mg KOH/g, and is preferably 25 to 50 mg KOH/g and more preferably 30 to 40 mg KOH/g. When the acid number exceeds 60 mg KOH/g, the water resistance and the workability of the resin coating layer tend to be insufficient. On the other hand, when the acid number is less than 20 mg KOH/g, the carboxylic acid concentration in the coating layer is decreased, and the carboxylic acid concentration on the surface of the coating layer is also relatively decreased, leading to difficulty in acquiring the carboxylic acid concentration value intended by the present invention.

The hydroxyl number of the polyester resin (A) is required to be 30 to 150 mg KOH/g, and is preferably 50 to 130 mg KOH/g and more preferably 60 to 100 mg KOH/g. When the hydroxyl number exceeds 150 mg KOH/g, the water resistance and the workability of the resin coating layer tend to be insufficient, and the synthesis of the resin is made difficult. On the other hand, when the hydroxyl number is less than 30 mg KOH/g, the hydroxyl terminal concentration in the coating layer is decreased, and the surface hydroxyl concentration of the coating layer is also relatively decreased, leading to difficulty in acquiring the surface hydroxyl concentration value intended by the present invention.

In the polyester resin (A), the sum of the acid number and the hydroxyl number is preferably 50 to 200 mg KOH/g, more preferably 60 to 150 mg KOH/g and furthermore preferably 70 to 110 mg KOH/g. When the sum of the acid number and the hydroxyl number exceeds 200 mg KOH/g, the synthesis of the resin tends to become difficult, or the water resistance and the workability of the resin coating layer tend to be insufficient. On the other hand, when the sum of the acid number and the hydroxyl number is less than 50 mg KOH/g, the adhesiveness after performing a processing treatment such as coating, printing or vapor deposition applied to the highly adhesive primer layer may be impaired, and in particular, the adhesiveness after hot water treatment such as boiling or retorting may be impaired.

The sum of the acid number and the hydroxyl number, the acid number and the hydroxyl number of the polyester resin (A) can be appropriately adjusted so as to fall within the intended ranges, for example, by copolymerization amount of the tri- or higher carboxylic acid component, the copolymerization amount of the trihydric or higher alcohol component or the like.

The polyester resin (A) constituting the highly adhesive primer layer is frequently subjected to a processing treatment such as coating, printing or vapor deposition; from the viewpoint that the adhesiveness after performing these processing treatments is improved and the polymerization of the polyester resin is easy to control, the ratio of the hydroxyl number to the acid number, (hydroxyl number/acid number) is preferably set at 2.0 to 5.0, more preferably at 2.5 to 4.5 and most preferably at 3.0 to 4.0.

The glass transition point of the polyester resin (A) is not particularly limited; however, for the purpose of improving the blocking resistance at the time of film winding-up, the concerned glass transition point is preferably 20° C. or higher and more preferably 30° C. or higher.

The thickness of the highly adhesive primer layer is preferably 0.001 µm or more from the viewpoint of maintaining the adhesiveness after boiling treatment or retorting treatment, and on the other hand, the concerned thickness is preferably 0.5 µm or less from the viewpoint of satisfactorily maintaining the exterior appearance and being economical. Thus, the concerned thickness is more preferably 0.005 to 0.1 µm and most preferably 0.01 to 0.05 µm.

The surface carboxylic acid concentration of the highly adhesive primer layer is preferably 0.005 or more and more preferably 0.010 to 0.200 from the viewpoint of maintaining the adhesiveness after boiling treatment or retorting treatment. Examples of the method for setting the surface carboxylic acid concentration at 0.005 or more include a method in which the acid number of the polyester resin (A) is set to fall within the above-described range and a method in which corona treatment is applied to the coating layer prepared by coating the substrate polyester film with the polyester resin (A) and by drying the coated polyester resin (A).

The surface hydroxyl concentration of the highly adhesive primer layer is preferably 0.005 or more and more preferably 0.020 to 0.200 from the viewpoint of maintaining the adhesiveness after boiling treatment or retorting treatment. Examples of the method for setting the surface hydroxyl concentration at 0.005 or more include a method in which the hydroxyl number of the polyester resin (A) is set to fall within the above-described range and a method in which corona treatment is applied to the coating layer prepared by coating the substrate polyester film with the polyester resin (A) and by drying the coated polyester resin (A).

The surface primary amine concentration of the highly adhesive primer layer is preferably 0.0001 or less from the viewpoint of maintaining the adhesiveness after boiling treatment or retorting treatment. Examples of the technique for making the surface amine concentration fall within a predetermined range include a technique in which neither a compound nor a resin that has amines at the terminals and side chains thereof is used in the coating layer. Specific examples of the compound and the resin each having amines at the terminals and side chains thereof include urea compounds, melamine compounds, acrylamide compounds and polyamide compounds, and the methylolated and methyl methylolated compounds of these compounds.

The highly adhesive primer layer is required not to substantially contain the crosslinking agent component. In the present invention, the phrase that "the crosslinking agent component is not substantially contained" means that the content of the crosslinking agent component is 0.1% by mass or less, inclusive of 0% by mass. The content of the crosslinking agent component is preferably 0% by mass. However, it causes no problem if the crosslinking agent component is contained in a trace amount not exceeding 0.1% by mass at maximum. Examples of the crosslinking agent required not to be substantially contained include isocyanate compounds, melamine compounds, urea compounds, epoxy compounds, carbodiimide compounds, oxazoline compounds and polyethyleneimine compounds.

The reasons for the fact that the highly adhesive primer layer is required not to substantially contain the crosslinking agent component are attributed to the fact that, as described below, when the highly adhesive primer layer is formed by coating with an aqueous coating material mainly composed of the polyester resin (A), the adhesiveness and the water resistance of the coating layer tend to be impaired due to the reaction of the crosslinking agent with water or the reaction between the crosslinking agent molecules. Among the crosslinking agents, melamine compounds or isocyanate compounds possibly give amine terminal structures after the crosslinking reaction, and hence remarkably tend to impair the coating layer, and hence the amounts of these compounds used are preferably as small as possible.

According to the present invention, due to no substantial inclusion of the crosslinking agent component, it is not necessary to use formaldehyde-generating substances such as melamine compounds. Consequently, the pollution of the work environment at the time of producing packaging materials can be suppressed, the environment can be sustained, and thus comfortable circumstances can be maintained.

The number average molecular weight of the polyester resin (A) is 500 or more for the purpose of making satisfactory the workability of the highly adhesive primer layer and imparting to the highly adhesive primer layer the solvent resistance to the organic solvent used in the printing processing or the laminate processing. Additionally, for the purpose of facilitating the production of the polyester resin (A) having the intended acid number and the intended hydroxyl number and for the purpose of making satisfactory the stability of the aqueous dispersion by imparting an appropriate viscosity to the aqueous dispersion when the aqueous dispersion is prepared, the number average molecular weight of the polyester resin (A) is preferably 7000 or less, more preferably 1000 or more and 6000 or less and particularly preferably 2000 or more and 5000 or less. The number average molecular weight of the polyester resin (A) can be derived on the basis of a GPC (gel permeation chromatography) analysis.

The oligomer content of the polyester resin (A) is required to be 2.0% by mass or less, and is more preferably 1.5% by mass or less and most preferably 1.0% by mass or less. When the oligomer content exceeds 2.0% by mass, the surface carboxyl concentration and the surface hydroxyl concentration of the coating layer of the polyester resin (A) tend to be decreased. When this is the case, the adhesiveness after performing a processing treatment such as coating, printing or vapor deposition applied to the highly adhesive primer layer is impaired, and in particular, the adhesiveness after hot water treatment such as boiling or retorting is significantly impaired.

The term oligomer as used herein means a component material generated during a polymerization process that has only polymerized to a low degree, thus having a small number of repeating units and a low molecular weight in comparison to a polymer. In the oligomers of a common polyester, about two to six repeating units each consisting of the acid and the alcohol constituting the polyester resin are polymerized to form chain-like forms or cyclic forms. The molecular weight of such an oligomer is varied depending on the acid and the alcohol as the raw materials of the polyester resin and the intended degree of polymerization; the number average molecular weight of the oligomers is about 100 to 2000. In the present invention, the oligomers of the polyester resin (A) are defined as the component based on the peak independently appearing in GPC analysis on the side of the lower molecular weight than that of the targeted polymer, and the amount of the thus defined component is measured by the below-described method.

The method for reducing the oligomers in the polyester resin (A) is not particularly limited; examples of such a method include: a method in which polyester polymerized by a heretofore known method is brought into contact with a liquid organic solvent at normal temperature and normal pressure to remove the oligomer; and a method in which the emulsion obtained by aqueous dispersion of polyester is allowed to stand still, and the precipitate generated with the elapse of time is appropriately removed by filtration, decantation or the like. In the present invention, preferable is the method in which the emulsion is allowed to stand still and the precipitate produced with time is appropriately removed by filtration treatment, decantation or the like because such a method is capable of removing the oligomer by means of a treatment low in environmental load in a simple and easy manner. When terephthalic acid, isophthalic acid, ethylene glycol, neopentylglycol and the like are used as the constituent components of the polyester resin (A), the precipitate is frequently composed of cyclic oligomers of terephthalic acid/ethylene glycol, terephthalic acid/neopentylglycol, isophthalic acid/neopentylglycol and the like. Such oligomers are high in crystallinity and have no terminal groups, and hence tend to segregate and precipitate in the emulsion. The still standing conditions are not particularly limited, but are for example such that the temperature and the time are appropriately set at 5 to 25° C. and 10 to 1000 hours, respectively.

In the present invention, the acid number, the hydroxyl number, the sum of these values and the oligomer amount of the polyester resin (A) used as the highly adhesive primer layer are required to simultaneously fall within the above-described ranges. For the purpose of improving the adhesiveness of the highly adhesive primer layer to the substrate film, it is important to increase the surface carboxylic acid concentration and the surface hydroxyl concentration. However, when the amount of the oligomers contained in the polyester resin (A) is large, the oligomer bleeds out to the coating layer surface, and consequently the layer surface carboxylic acid concentration and the layer surface hydroxyl concentration are relatively decreased. Because of such reasons, the polyester resin (A) constituting the highly adhesive primer layer is required to be subjected to the control of the oligomer amount as well as the adjustment of the acid number and the hydroxyl number thereof.

In the present invention, the polyester resin (A)-containing highly adhesive primer layer formed on the substrate film can be obtained in a simple and easy manner by converting the polyester resin (A) into an aqueous dispersion and by coating the substrate film with the aqueous coating material mainly composed of the aqueous dispersion.

The method for preparing the aqueous dispersion of the polyester resin (A) is not particularly limited; however, examples of such a method include a method in which the polyester resin (A) and a basic compound are added to an aqueous solvent and the resulting mixture is stirred to prepare a dispersion. The basic compound neutralizes the carboxyl group in the polyester resin to produce the carboxyl anion, and the electric repulsion between the anions stably disperses the polyester resin. As the added basic compound, preferable is an organic amine or ammonia that is a basic compound scarcely remaining in the coating layer after the formation of the resin coating layer and has a boiling point of 250° C. or lower, preferably 160° C. or lower. Examples of the preferable organic amine include triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, morpholine, N-methylmorpholine and N-ethylmorpholine. It is preferable to use, among these, ammonia, triethylamine and N,N-dimethylethanolamine.

The solid content concentration of the polyester resin (A) in the aqueous coating material may be appropriately varied according to the specifications of the coating device and the drying-heating device. However, from the viewpoint of the drying time and the coatability, the solid content concentration of the polyester resin (A) is preferably in a range from 3 to 30% by mass.

A surfactant may be added to the aqueous coating material in addition to the polyester resin (A) as the main component, for the purpose of promoting the wetting to the film when the aqueous coating material is applied to the film and thus improving the coatability of the aqueous coating material. Examples of the surfactant may include: anionic surfactants such as polyethylene alkylphenyl ether, polyoxyethylene fatty acid ester, glycerin fatty acid ester, fatty acid metal soaps, alkylsulfuric acid salts, aklylsulfonic acid salts and alkylsulfosuccinic acid salts; and nonionic surfactants such as acetylene glycol. It is appropriate that the amount of the surfactant is 0.01 to 1% by mass in the aqueous coating material. The surfactant bleeds out like the oligomer to the coating layer surface, and consequently the surface carboxylic acid concentration and the surface hydroxyl concentration are relatively decreased as the case may be, and hence preferable is a surfactant that is evaporated at the heat treatment temperature in the film drying step. When the surfactant remains in the coating layer, the amount of the remaining surfactant is preferably confined within a range from 0.1 to 5% by mass.

Inorganic or organic particles may be added to the aqueous coating material, for the purpose of imparting the blocking resistance of the highly adhesive primer layer. Examples of the materials for inorganic particles may include calcium carbonate, magnesium carbonate, calcium oxide, zinc oxide, magnesium oxide, silicon oxide, sodium silicate, aluminum hydroxide, iron oxide, zirconium oxide, barium sulfate, titanium oxide and carbon black. Examples of the materials for organic particles may include acrylic crosslinked polymer, styrene crosslinked polymer, phenolic resin, nylon resin and polyethylene wax. The particle sizes of the inorganic and organic particles are preferably 0.0001 to 5 μm and more preferably 0.01 to 1 μm. The addition amount of such a particle is preferably 0 to 1.0% by mass in the aqueous coating material, and is in a range from 0 to 10% by mass in the obtained coating layer.

As the method for producing the highly adhesive polyester film of the present invention, simple and easy is a method in which the aqueous coating material mainly composed of the polyester resin (A) is applied to at least one side of the substrate polyester film as described above. In this case, the application of the aqueous coating material to the substrate film can be performed at any stage in the production process of the substrate film. However, it is preferable to apply to the substrate film before the completion of the orientational crystallization. The phrase "the substrate film before the completion of the orientational crystallization" means an unstretched film, or a uniaxially stretched film or the like, the uniaxially stretched film being obtained by orienting an unstretched film in any one direction of the longitudinal direction and the transverse direction. Preferably, after the aqueous coating material is applied to the substrate film, the substrate film is stretched in at least one direction together with the coating layer, and then subjected to heat fixation treatment together with the coating layer. The stretching method may be appropriately modified according to the properties of the polyester resin used; however, the stretching method is preferably a simultaneous biaxial tenter stretching method or a successive biaxial stretching method.

In more detail, for example, a pellet mixture of the modified PBT and the PET pellets as a raw material is placed in an extruder, heat-melted, and then extruded from a T-die in a form of a sheet; the sheet is rapidly cooled to produce a film by bringing the extruded sheet into close contact with a cooling drum by means of an electrostatic casting method or the like, and thus the unstretched substrate film is obtained. Successively, to the unstretched film the aqueous coating material mainly composed of the polyester resin (A) is applied and then the thus treated unstretched film is converted into a biaxially stretched polyester film by the successive biaxial stretching method or the simultaneous biaxial stretching method. According to this method, the preheating step, the stretching step and the thermal setting step in the stretching process to form the biaxially stretched polyester film each apply heat to the polyester film, and consequently the aqueous coating material is dried to form the highly adhesive primer layer and at the same time, the substrate polyester film and the highly adhesive primer layer are made to strongly adhere to each other. Therefore, the above-described method is excellent in performances as compared to the so-called post coating method in which coating is performed after stretching, and additionally advantageous with respect to cost.

The stretching temperature of the substrate film is preferably 90 to 145° C. from the viewpoints of the homogeneity and the transparency. From the viewpoint of the balance between the pinhole strength and the stretchability, the stretching magnification is preferably such that the longitudinal and transverse stretching magnifications each fall within a range from 3.0 to 5.0×. Further, for the purpose of setting the thermal shrinkage of the film within an appropriate range, the heat treatment is preferably performed at a temperature of 210° C. or higher and 245° C. or lower, 245° C. being the upper limit of the temperature at which the fusion break of the film is inhibited.

The method for applying the aqueous coating material to the substrate film is not particularly limited; usable as such a method are common methods such as gravure roll coating, reverse roll coating, wire bar coating and air knife coating.

The thickness of the highly adhesive polyester film of the present invention is preferably 9 μm or more for the purpose of improving the linear tearability and the impact resistance, and is preferably in a range of 25 μm or less in which range the transparency and the flex fatigue resistance are not degraded. The more preferable range is 12 to 16 μm.

The highly adhesive polyester film of the present invention is excellent in the adhesion to various materials owing to the highly adhesive primer layer. Therefore, the highly adhesive polyester film of the present invention can be used as packaging materials and industrial films by adopting various lamination configurations. In particular, the highly adhesive polyester film of the present invention maintains excellent adhesiveness even after the hot water treatment such as boiling or retorting, and hence is suitable for applications to packaging of food subjected to such treatment.

The lamination configuration to which the highly adhesive polyester film of the present invention is applied may be a configuration including many layers such as two or three layers as long as at least one layer of an easily tearable polyester film is included. Examples of the other layer include a heat sealing resin layer and a gas barrier layer, without imposing any particular restriction.

As the material constituting the heat sealing resin layer, the materials commonly used as sealants of packaging materials can be used. For example, polyethylene, polypropylene, ethylene-vinyl acetate copolymer and ionomers can be used. The thickness of the heat sealing resin layer is not particularly limited, and can be appropriately determined according to need, but is usually about 20 to 100 μm.

As the materials constituting the gas barrier layer, materials commonly used for imparting to packaging materials the barrier property against oxygen or water vapor can be used. For example, polyvinyl alcohol, Eval (trade name), vapor deposited aluminum, aluminum foil, polyvinylidene chloride and silicon oxide can be preferably used. The thickness of the gas barrier layer is not particularly limited, and can be appropriately determined according to the application purpose.

Examples of other constituent materials for the laminated films include: resin films such as nylon film, polyester film and polyolefin film; metal foils such as aluminum foil; paper; and nonwoven fabric.

When the highly adhesive polyester film of the present invention is used in the applications to food packaging, there can be adopted configurations such as the same film/heat sealing resin, the same film/nylon resin/heat sealing resin, the same film/aluminum/heat sealing resin, the same film/aluminum/nylon resin/heat sealing resin and the same film/nylon resin/aluminum/heat sealing resin.

When the highly adhesive polyester film of the present invention and another layer are made to adhere to each other, an adhesive may be used. Examples of such an adhesive include polyurethane adhesives, polyimide adhesives, polyolefin adhesives and polyacrylic acid adhesives. Particularly preferable among these are polyurethane adhesives because of being widely used as the adhesives for food packaging from the viewpoints of the safety of food, the reactivity and the cost. Between the layers with which the highly adhesive polyester film of the present invention is not in direct contact, the above-described adhesives can be appropriately used.

The application amount of the adhesive is appropriately selected; however, the application amount is preferably in a range from 0.5 to 10 g/m$^2$ (dry) and more preferably in a range from 1 to 5 g/m$^2$ (dry). The use of a polyurethane adhesive particularly in the above-described range facilitates the development of the laminate strength after the below-described retorting treatment.

The laminate strength between the highly adhesive polyester film and the other layer, after the retorting treatment at 135° C. for 30 minutes, is preferably 200 g/15 mm width or more and more preferably 400 g/15 mm width or more. In the case where the laminate strength is smaller than 200 g/15 mm width, when the obtained packaging bag is opened, delamination occurs, the linear tearability is degraded and additionally the pressure capacity and the bag drop strength are insufficient and hence such laminate strength can be a cause for bag breaking. In the case where the laminate strength is larger than 400 g/15 mm width, when the packaging bag is opened, the bag can be opened smoothly without causing delamination, and additionally the practical strength can be sufficiently maintained. The above-described laminate strength can be easily attained by using the highly adhesive polyester film of the present invention and by appropriately selecting the adhesive and the like according to need.

By making a bag with a laminated film using the highly adhesive polyester film, a packaging bag can be obtained. The packaging form of the packaging bag is not particularly limited. Examples of the packaging form of the packaging bag may include forms such as a three-side sealing bag, a four-side sealing bag, a standing pouch, a pillow bag, a gazette bag and a stick bag. When any of these packaging bags is made in such a way that the liner tearability direction of the laminated film coincides with the opening direction of the bag, a highly convenient packaging bag is formed.

In the laminated film provided with the heat sealing resin layer, an outer layer film can be laminated on the surface opposite to the surface on the side where the heat sealing resin layer in the highly adhesive polyester film is formed. The lamination of the outer layer film imparts rigidity. Preferable as such an outer layer film is a biaxially stretched film made of polyester, nylon or the like, having excellent printing adaptability and flexibility. The thickness of the outer layer film is not particularly limited, and can be appropriately selected according to the intended use. The gas barrier layer may be disposed between the highly adhesive polyester film and the outer layer film. When the outer layer film is laminated, the highly adhesive primer layer in the present invention may be disposed as a primer layer.

In the highly adhesive polyester film of the present invention, on the highly adhesive primer layer thereof, a printing ink layer or a vapor deposited layer made of a metal or a metal oxide can be disposed. The type of usage of such a layer is not particularly limited; however, for example, the printing ink layer or the vapor deposited layer may be disposed on a part of the surface of the highly adhesive primer layer and further a heat sealing resin may be laminated on the disposed layer, or alternatively, the highly adhesive primer layer may be disposed on each of the both sides of the substrate polyester film, and then, as described above, the heat sealing resin may be laminated on one side and the printing ink layer or the vapor deposited layer may be disposed on the other side. The printing ink is not particularly limited; however, there can be used generally known inks such as thermosetting gravure ink, flexo ink, ultraviolet curable ink, electron beam curable ink and thermal recording ink. As the printing ink, any type of a solvent type, a non-toluene type, an aqueous type and a non-solvent type can be used. Examples of the metal or the metal oxide used in the vapor deposition include aluminum, silicon, titanium, chromium, zinc, gold, silver, copper, stainless steel, and the oxides of these metals. Additionally, the starting materials may be organometallic compounds such as metal alkoxides or inorganic metal compounds such as metal halides.

EXAMPLES

The present invention is described in more detail by showing Examples and Comparative Examples. However, the present invention is not limited only to following Examples. The evaluation methods of the various physical properties in following Examples are as follows.

Laminated Film And Packaging Bag For Evaluation

Polyester/CPP Laminated Film

The surface of the highly adhesive primer layer of a polyester film was coated with a polyurethane adhesive (A525, manufactured by Mitsui Takeda Chemical Co., Ltd.) for dry lamination in an amount of 4 g/m$^2$, and then a 50-μm thick unstretched polypropylene film (CPP) (RXC-21, manufactured by Tohcello Co., Ltd.) was bonded to the above-described surface. In more detail, the surface of the highly adhesive primer layer of a polyester film was coated with the adhesive and then dried at 75° C. for 1 second. Then, a CPP film was bonded to the surface at a nip temperature of 80° C., and thus a laminated film was obtained. Subsequently, the laminated film was subjected to an aging at 40° C. for 48 hours and was used for the evaluations.

Polyester/Al/CPP Laminated Film

The surface of the highly adhesive primer layer of a polyester film was coated with a polyurethane adhesive (A525, manufactured by Mitsui Takeda Chemical Co., Ltd.) for dry lamination in an amount of 4 g/m$^2$ and dried at 75° C. for 1 second. Then, a 7-μm thick aluminum foil was bonded to the surface at a nip temperature of 80° C. Then, the surface of the aluminum foil was coated with a polyurethane adhesive (a mixture of A525 and a curing agent A52, manufactured by Mitsui Takeda Chemical Co., Ltd.) for dry lamination in an amount of 4 g/m², and in the same manner as described above, a 50-μm thick unstretched polypropylene film (CPP) was bonded to the surface of the aluminum foil. Subsequently, the thus obtained laminated film was subjected to an aging at 40° C. for 48 hours and was used for the evaluations.

Packaging Bag

From each of the laminated films obtained as described above, a 200-mm square four-side sealing bag with a sealing width of 10 mm was prepared in such a way that the lengthwise direction coincides with the linear tearability direction, and then 300 g of water was filled in the bag. The packaging bag was subjected to a retorting treatment at 120° C. for 30 minutes or a retorting treatment at 135° C. for 30 minutes, dried for 1 day, and then subjected to the evaluations of the opening performance and the laminate strength. The evaluations before the retorting treatment were also performed.

Evaluation Items (1) Opening Performance

A cutting notch was formed in the lengthwise direction (linear tearability direction) in a sealing portion of a four-side sealing bag, and the bag was opened by tearing with hands to the opposite sealing portion. The tearing speed was set at 200 mm/1.5 sec. After opening, the maximum value of the length difference in the widthwise direction between the laminated films of the front side and the back side of the bag was measured in units of mm. For each sample, five runs of measurement were performed and the average value was adopted, and the average value was rounded to the nearest millimeter. The obtained value was evaluated according to the following standards, and thus the linear tearability was evaluated. The smaller the difference, the better the linear tearability.

Further, the tear resistance was evaluated on the basis of the occurrence or nonoccurrence of the delamination, the delamination condition and the resistance at the time of opening according to the following evaluation standards.

Linear Tearability

E (Excellent): The maximum difference is 5 mm or less.
G (Good): The maximum difference is 6 to 10 mm.
A (Average): The maximum difference is 11 to 15 mm.
P (Poor): The maximum difference is 16 mm or more.

For practical applications, the evaluation of the linear tearability is preferably E or G, namely, the average of the maximum differences is preferably 10 mm or less.

Tear Resistance

E (Excellent): Almost no resistance is found (no delamination occurs, and opening can be performed smoothly).
G (Good): Slight resistance is found (somewhat delamination is involved, but opening can be performed comparatively smoothly).
A (Average): Resistance is found (delamination is involved, and opening is slightly difficult).
P (Poor): Large resistance is found (delamination is severe, and opening is extremely difficult).

For practical applications, the evaluation of the tear resistance is preferably E or G.

(2) Laminate Strength

A 15-mm wide specimen was cut out from a "polyester/CPP laminated film" or a "polyester/Al/CPP laminated film" prepared as described above, and the laminate strength (g/15 mm width) of the specimen was measured in an environment of 20° C. and 65% RH at a tensile speed of 300 mm/min with a T-peel method.

In the polyester/CPP laminated film, the peeling strength of the interface between the polyester film and the CPP film was measured, and in the polyester/Al/CPP laminated film, the peeling strength of the interface between the polyester film and aluminum was measured.

The measurement was performed under two types of conditions, namely, under application of water to the peeling portion (water-wetted condition) and under no application of water to the peeling portion (ordinary condition).

The evaluation standards are as follows.

E (Excellent): 400 g/15 mm width or more
G (Good): 300 g/15 mm width or more and less than 400 g/15 mm width
A (Average): 200 g/15 mm width or more and less than 300 g/15 mm width
P (Poor): less than 200 g/15 mm width The laminate strength of 200 g/15 mm width or more based on the present measurement method is evaluated to be free from problems for practical applications.

(3) Acid Number of Polyester Resin

In 50 ml of a solvent of water/dioxane=10/1 (volume ratio), 1 g of polyester resin was dissolved, and the resulting solution was titrated with KOH in the presence of cresol red as an indicator. Thus, the number of milligrams of KOH consumed for neutralization was converted into a value per 1 g of the polyester resin to derive the acid number of the polyester resin.

(4) Hydroxyl Number of Polyester Resin

First, 3 g of a polyester resin was accurately weighed out. To the polyester resin, 0.6 ml of acetic anhydride and 50 ml of pyridine were added and the resulting mixture was allowed to react under stirring at room temperature for 48 hours. Successively, 5 ml of distilled water was added to the reaction mixture and the resulting reaction mixture was allowed to react further for 6 hours at room temperature under continuous stirring to completely convert the fraction, unconsumed in the above-described reaction, of the acetic anhydride into acetic acid. To the resulting solution, 50 ml of dioxane was added, and the solution was titrated with KOH in the presence of cresol red and thymol blue as the indicators. From the amount ($W_1$) of KOH consumed for neutralization and the amount (calculated value: $W_0$) of KOH to be required for neutralization of the acetic acid assumed to be obtained from the complete conversion of the acetic anhydride initially fed and assumed to remain unreacted with the polyester resin, the difference ($W_0-W_1$) was obtained in terms of the number of milligrams of KOH, and the difference thus obtained was divided by the number of grams of the polyester resin to yield the hydroxyl number.

(5) Amount of Oligomers In Polyester Resin

A molecular weight (number average molecular weight) chart relative to polystyrene standards was obtained by GPC analysis (a solvent delivery unit model LC-10ADvp and an ultraviolet-visible spectrophotometer manufactured by Shimadzu Corp. were used. Detection wavelength: 254 nm, solvent: tetrahydrofuran). For the analysis of GPC, a dedicated software "Shimadzu Chromatography Data System [CLASS-VP] manufactured by Shimadzu Corp. was used.

The amount of the oligomers was obtained from the results shown in the molecular weight chart. In detail, the molecular weight peak on the side of the lower molecular weight than that of the peak constituting the main molecular weight distribution of the polyester resin was defined as the molecular weight peak due to the oligomers; and the ratio of the area of the oligomer peak thus defined to the total peak area of the chart was derived. The areas represented in the molecular weight chart reflected the concentrations of the respective components in terms of the molecular weights relative to the polystyrene standards, and hence the amount of the oligomers was represented in terms of percent by mass.

Figure 1:
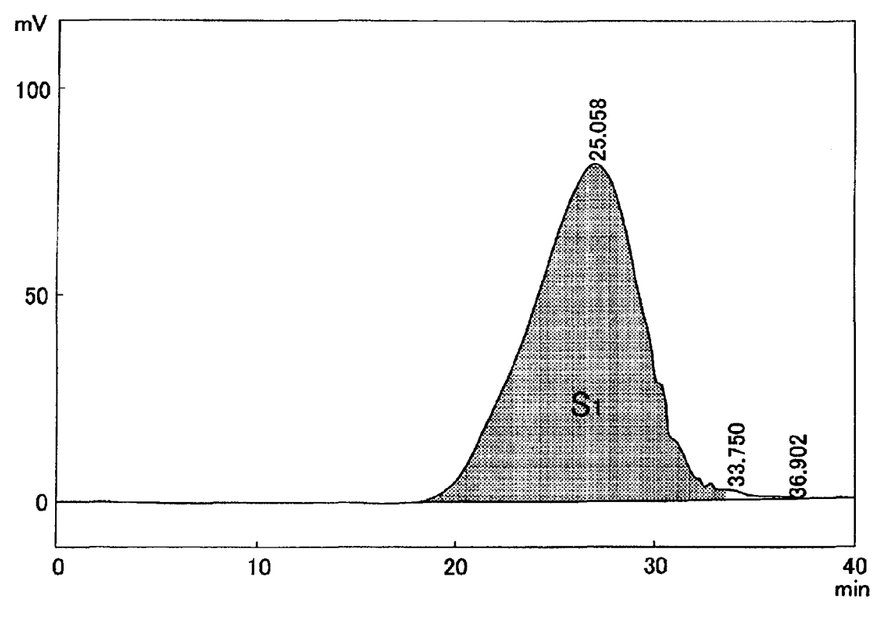
FIG. 1 is a chart showing the polyester peak area $S_1$ in the molecular weight chart obtained from the GPC analysis of the polyester resin in Example 1.

What has been described above is described specifically with reference to FIG. 1. FIG. 1 is a molecular weight chart in the GPC analysis of the polyester resin used in Example 1. In this chart, the main peak of the polyester resin was found at the peak time of 25.058 min and the peak due to the oligomer was found at the peak time of 33.750 min. Incidentally, the peak at 36.902 min is identified as the peak due to tetrahydrofuran used as the solvent. In this case, the oligomer amount was obtained by using the following formula from the total area (S) of the polyester resin inclusive of the oligomers in the molecular weight chart obtained on the basis of the GPC analysis and the polyester peak area ($S_1$) constituting the main molecular weight distribution obtained from the vertical partition defined in the above-described devoted software.

Amount of oligomers [% by mass]=$(S-S_1)/S \times 100$

(6) Surface Carboxylic Acid Concentration, Surface Hydroxyl Concentration and Surface Primary Amine Concentration of the Coating Layer Measurement Conditions The ESCA (X-ray photoelectron spectrometer) KRATOS AXIS-HSi manufactured by Shimadzu Corp. was used, and measurements were performed under the following conditions.
X-ray source: Al Kα
X-ray output: 150 W
Photoelectron take-off angle: 90 degrees to the sample surface
Bonding energy: Shift correction was applied by setting the C 1s spectrum at 285.0 eV.

Measurement Method of Surface Carboxylic Acid Concentration

A film with a coating layer formed thereon was cut out to an appropriate size to prepare a sample, and the sample was subjected to the chemical modification of COOH by vapor phase chemical modification. For the chemical modification, trifluoroethanol (TFE) was used. In a vial bottle in which TFE, dicyclohexylcarbodiimide (DCC) and pyridine were placed, and the sample and reagents were subjected to a vapor-phase reaction with each other in a noncontact manner. The reaction formula is as follows.

The reaction rate γ of the reaction of the above-described formula was calculated from the ratio of the $CF_3$ structure to the COO structure in the C 1s spectrum of a polyacrylic acid (PAA) standard sample which was reacted in the vial bottle at the same time as the film was reacted. The $C_6H_{11}NHCONHC_6H_{11}$ on the right hand side of the reaction formula sometimes remained on the sample surface, and the remaining percentage m was calculated on the basis of the O 1s spectrum of the PAA standard sample after the chemical modification. In other words, the two oxygen atoms of the R—$COOCH_2CF_3$ after the reaction and the one oxygen atom of $C_6H_{11}NHCONHC_6H_{11}$ were distinguished from each other on the basis of the waveform separation, and the remaining percentage m was calculated on the basis of the following formula.

$$m=2[O_{NH\text{-}CO\text{-}NH}]/([O_{C=O}]+[O_{C\text{-}O}])$$

(numerator: the oxygen derived from $C_6H_{11}NHCONHC_6H_{11}$; denominator: the oxygen derived from R—$COOCH_2CF_3$.)

The surface carboxylic acid concentration was calculated as the ratio ([COOH]/[C]) of the COOH content to the total carbon content, on the basis of the following formula.

$$[COOH]/[C] = ([F\ 1s]/3)/(([C\ 1s]-2[F\ 1s]/3-13m[F\ 1s]/3)\gamma)$$

$$= [F\ 1s]/((3[C\ 1s]-2[F\ 1s]-13m[F\ 1s])\gamma)$$

In the above-presented formula, [C 1 s] and [F 1 s] are respectively the atomic percentages of C and F obtained, respectively, from the C 1 s and F 1 s signals.

Measurement Method of Surface Hydroxyl Concentration

The chemical modification of the OH group was performed by using trifluoroacetic anhydride (TFAA). In a vial bottle in which the air was replaced with $N_2$, a sample and TFAA were subjected to a vapor-phase reaction with each other in a noncontact manner. The reaction formula is as follows.

The reaction rate of the chemical modification was able to be calculated as the ratio of the $CF_3$ structure to the C—O structure in the C 1 s spectrum of polyvinyl alcohol (PVA) placed in a reaction vessel at the same time as the sample was placed. In this case, the ratio ([OH]/[C]) of OH to the total carbon content was calculated on the basis of the following formula.

$$[OH]/[C] = ([F\ 1s]/3)/([C\ 1s]-2[F\ 1s]/3)$$

$$= [F\ 1s]/(3[C\ 1s]-2[F\ 1s])$$

In the above-described formula, [C 1 s] and [F 1 s] are respectively the atomic percentages of C and F obtained, respectively, from the C 1 s and F 1 s signals.

Measurement Method of Surface Primary Amine Concentration

The chemical modification of the $NH_2$ group was performed by using pentafluorobenzaldehyde (PFB). In this case, in a vial bottle containing PFB placed therein, a sample and PFB were subjected to a vapor-phase reaction with each other in a noncontact manner. The reaction formula is as follows.

The surface primary amine concentration was calculated as follows as the ratio ($[NH_2]/[C]$) of $NH_2$ to the total carbon content. In this case, γ represents the reaction rate, and was able to be calculated from the elemental ratio (γ=[F 1s]/5[N 1s]) of F to N of 4,4'-diaminodiphenyl ether (DADPE) which was reacted at the same time as the sample was reacted.

$$[NH_2]/[C] = ([F\ 1s]/5)/(([C\ 1s] - 7[F\ 1s]/5)\gamma)$$
$$= [F\ 1s]/((5[C\ 1s] - 7[F\ 1s])\gamma)$$

Example 1

Production of Polyester Resin (A)

A polycarboxylic acid material composed of 58 mol % of terephthalic acid, 4 mol % of sebacic acid, 32 mol % of naphthalene dicarboxylic acid and 6 mol % of trimellitic acid and a polyhydric alcohol material composed of 35 mol % of ethylene glycol, 29 mol % of 1,4-butanediol and 36 mol % of neopentyl glycol were used. These materials were placed in a reactor so as to satisfy the relation (polyhydric alcohol material)/(polycarboxylic acid material)=1.13 (molar ratio), and tetrabutyl titanate was added in the reactor as a catalyst in an amount of 0.04 mol % in relation to the number of moles of the polycarboxylic acid material. Then, the reaction mixture was heated to a temperature of 240° C. in a nitrogen atmosphere over a period of 4 hours. In this case, the generated methanol and water were distilled off. Then, the pressure in the reaction system was gradually decreased and the polycondensation was allowed to proceed for 2 hours. Further, the reaction system was cooled down to 200° C. Then, to the reaction system, trimellitic anhydride was fed in an amount of 5 mol % in relation to the already used polycarboxylic acid material and trimethylolpropane was fed in an amount of 5 mol % in relation to the already used polyhydric alcohol material, and the addition reaction was allowed to proceed for 2 hours. Thus, there was obtained a polyester resin (A) having a composition of terephthalic acid/sebacic acid/naphthalene dicarboxylic acid/trimellitic acid/ethylene glycol/1,4-butanediol/neopentyl glycol/trimethylolpropane=55/4/30/11/34/27/35/4 (molar ratio).

Water Compatibilization of Polyester Resin (A)

A stirrer (T. K. Robomix, manufactured by Tokushu Kika Kogyo Co., Ltd.) equipped with a jacketed, hermetically sealable glass vessel having an effective inner volume of 2 liters was used. In the glass vessel of the stirrer, 300 g of the above-described polyester resin (A), 100 g of ethylene glycol monobutyl ether, 90.3 g of a 30% aqueous ammonia and 509.7 g of distilled water were placed, and stirred at a rotation speed of a stirring blade (homodisper) set at 7,000 rpm. Next, the reaction mixture was heated by passing hot water through the jacket of the stirrer and was stirred for 60 minutes at the temperature thereof maintained at 73 to 75° C. Thereafter, while cold water was being passed through the jacket and stirring was being conducted with the rotation speed of the stirring blade decreased down to 5,000 rpm, the reaction mixture was cooled down to room temperature (about 25° C.).

Then, the reaction mixture was filtered with a 300-mesh stainless steel filter to yield a polyester resin aqueous dispersion having a solid content concentration of 25% by mass.

The amount of the oligomers of the obtained polyester resin aqueous dispersion was measured by GPC and found to be 1.32% by mass. Therefore, no oligomer removal step was conducted.

Preparation of Aqueous Coating Material

To the polyester resin aqueous dispersion obtained by the water-compatibilization based on the above-described method, an acetylene glycol surfactant, Olfine E1004 (manufactured by Nissin Chemical Industry Co., Ltd.) was added in an amount of 0.1 part by mass per 100 parts by mass of the polyester resin solid content, and the polyester resin aqueous dispersion was appropriately diluted with water. Thus, an aqueous coating material having a composition including 5% by mass of the polyester resin solid content and 0.005% by mass of the surfactant was prepared.

Production of Modified PBT

First, 194 parts by mass of dimethyl terephthalate, 108 parts by mass of 1,4-butanediol and 80 ppm (the ratio of the mass of titanium metal to the total mass of the produced PBT unit) of tetrabutyl titanate were mixed together, and the resulting mixture underwent transesterification for 2.5 hours while the resulting mixture was being heated to 210° C. To the obtained product, 40 ppm (based on the same standard as described above) of tetrabutyl titanate was added, and PTMG (PTMG1000 manufactured by Mitsubishi Chemical Corp.) having a molecular weight of 1000 was added so as to satisfy the relation PBT unit:PTMG unit=90:10 (mass ratio) in the produced polymer. Then the pressure was reduced, and finally reduced to 1 hPa, and the temperature was increased to 245° C., and the reaction mixture was subjected to polymerization for 2 hours, to yield a modified PBT having a relative viscosity of 1.6 (measured by using a 1:1 (mass ratio) mixed solvent of phenol and ethane tetrachloride, at a concentration of 5 mg/ml, at a temperature of 20° C.).

Production of Polyester Film

A PET which contained 0.1% by mass of silica having an average particle size of 1.0 μm and had a relative viscosity of 1.38 (measured under the conditions that the solvent used was a 1:1 (mass ratio) mixture of phenol and ethane tetrachloride, the temperature was set at 20° C. and the concentration was set at 0.5 g/100 ml) and the above-described modified PBT were mixed in ratio of PET/modified PBT=80/20 (mass ratio) to prepare a starting material. This starting material was used, and was extruded from an extruder (a low compression single screw of 75 mm in diameter with L/D=45) equipped with a T-die into a sheet shape under the conditions of 280° C. and a discharge rate of 500 g/min. Successively, the sheet was brought into close contact with a casting roll with the surface temperature controlled at 18° C., and thus rapidly cooled to yield a 120-μm thick unstretched film.

Next, one side of the unstretched film thus obtained was coated with the already prepared aqueous coating material and preliminarily dried, and then the unstretched film was stretched at 90° C. by a factor of 3.3× with a roll longitudinal stretching machine and stretched at 120° C. by a factor of 3.3× with a tenter transverse stretching machine. Then, the stretched film was heat treated at 235° C. with a transverse relaxation rate set at 3%, and slowly cooled down to room temperature. Thus, there was obtained a polyester film in which the thickness of the substrate film was 12 μm and the thickness of the coating layer (corresponding to the highly adhesive primer layer) was 0.04 μm. The surface carboxylic acid concentration, the surface hydroxyl concentration and the surface primary amine concentration of the coating layer of the polyester film were measured.

Example 2

As compared to Example 1, the material feeding conditions were altered so as for a polyester resin (A) to have a composition of terephthalic acid/sebacic acid/2,6-naphthalene dicarboxylic acid/trimellitic acid/ethylene glycol/1,4-butanediol/neopentyl glycol/trimethylolpropane=53/4/30/12/35/25/34/6 (molar ratio), and thus the polyester resin (A) was synthesized and water-compatibilized.

The amount of the oligomers of the obtained polyester resin aqueous dispersion was measured by GPC and found to be 0.85% by mass. Therefore, no oligomer removal step was conducted. An aqueous coating material was obtained in the same manner as in Example 1. By using the aqueous coating material, a polyester film having a coating layer corresponding to the highly adhesive primer layer was obtained in the same manner as in Example 1.

Example 3

As compared to Example 1, the material feeding conditions were altered so as for a polyester resin (A) to have a composition of terephthalic acid/2,6-naphthalene dicarboxylic acid/trimellitic acid/ethylene glycol/1,4-butanediol/neopentyl glycol/trimethylolpropane=28/49/23/35/36/21/8 (molar ratio), and thus the polyester resin (A) was synthesized and water-compatibilized.

The amount of the oligomers of the obtained polyester resin aqueous dispersion was measured by GPC and found to be 1.22% by mass. Therefore, no oligomer removal step was conducted. An aqueous coating material was obtained in the same manner as in Example 1. By using the aqueous coating material, a polyester film having a coating layer corresponding to the highly adhesive primer layer was obtained in the same manner as in Example 1.

Example 4

As compared to Example 1, the material feeding conditions were altered so as for a polyester resin (A) to have a composition of terephthalic acid/2,6-naphthalene dicarboxylic acid/trimellitic acid/ethylene glycol/1,4-butanediol/neopentyl glycol/trimethylolpropane=17/64/19/51/12/19/18 (molar ratio), and thus the polyester resin (A) was synthesized and water-compatibilized.

The amount of the oligomers of the obtained polyester resin aqueous dispersion was measured by GPC and found to be 0.56% by mass. Therefore, no oligomer removal step was conducted. An aqueous coating material was obtained in the same manner as in Example 1. By using the aqueous coating material, a polyester film having a coating layer corresponding to the highly adhesive primer layer was obtained in the same manner as in Example 1.

Example 5

As compared to Example 1, the material feeding conditions were altered so as for a polyester resin (A) to have a composition of terephthalic acid/isophthalic acid/sebacic acid/trimellitic acid/ethylene glycol/1,4-butanediol/neopentyl glycol=61/17/7/15/24/32/44 (molar ratio), and thus the polyester resin (A) was synthesized and water-compatibilized.

The amount of the oligomers of the obtained polyester resin aqueous dispersion was measured by using GPC and found to be 3.58% by mass. Therefore, the polyester resin aqueous dispersion was continuously allowed to stand still until the amount of the oligomers came to be 2% by mass or less. At a still-standing time of 432 hours, the amount of the oligomers was found to be 0.40% by mass. Then, by using the aqueous dispersion thus obtained, an aqueous coating material was prepared. By using the aqueous coating material, a polyester film having a coating layer corresponding to the highly adhesive primer layer was obtained in the same manner as in Example 1.

Example 6

As compared to Example 1, the material feeding conditions were altered so as for a polyester resin (A) to have a composition of terephthalic acid/2,6-naphthalenedicarboxylic acid/trimellitic acid/ethylene glycol/1,4-butanediol/neopentyl glycol=18/71/11/63/13/24 (molar ratio), and thus the polyester resin (A) was synthesized and water-compatibilized. The oligomers were removed in the same manner as in Example 5 to yield an aqueous coating material containing the polyester having a predetermined oligomer amount. By using the aqueous coating material, a polyester film having a coating layer corresponding to the highly adhesive primer layer was obtained in the same manner as in Example 1.

Example 7

As compared to Example 1, the material feeding conditions were altered so as for a polyester resin (A) to have a composition of terephthalic acid/2,6-naphthalenedicarboxylic acid/trimellitic acid/ethylene glycol/1,4-butanediol/neopentyl glycol=28/49/23/38/38/24 (molar ratio), and thus the polyester resin (A) was synthesized and water-compatibilized. The oligomers were removed in the same manner as in Example 5 to yield an aqueous coating material containing the polyester having a predetermined oligomer amount. By using the aqueous coating material, a polyester film having a coating layer corresponding to the highly adhesive primer layer was obtained in the same manner as in Example 1.

Example 8

As compared to Example 1, the material feeding conditions were altered so as for a polyester resin (A) to have a composition of terephthalic acid/isophthalic acid/sebacic acid/trimellitic acid/ethylene glycol/1,4-butanediol/neopentyl glycol=59/16/7/18/32/28/40 (molar ratio), and thus the polyester resin (A) was synthesized and water-compatibilized. The oligomers were removed in the same manner as in Example 5 to yield an aqueous coating material containing the polyester having a predetermined oligomer amount. By using the aqueous coating material, a polyester film having a coating layer corresponding to the highly adhesive primer layer was obtained in the same manner as in Example 1.

Example 9

As compared to Example 1, the material feeding conditions were altered so as for a polyester resin (A) to have a composition of terephthalic acid/sebacic acid/2,6-naphthalenedicarboxylic acid/trimellitic acid/ethylene glycol/1,4-butanediol/ neopentyl glycol=56/4/30/10/36/27/37 (molar ratio), and thus the polyester resin (A) was synthesized and water-compatibilized. The oligomers were removed in the same manner as in Example 5 to yield an aqueous coating material containing the polyester having a predetermined oligomer amount. By using the aqueous coating material, a polyester film having a coating layer corresponding to the highly adhesive primer layer was obtained in the same manner as in Example 1.

Example 10

As compared to Example 1, the material feeding conditions were altered so as for a polyester resin (A) to have a composition of terephthalic acid/2,6-naphthalenedicarboxylic acid/trimellitic acid/ethylene glycol/1,4-butanediol/neopentyl glycol/trimethylolpropane=17/64/19/41/12/19/28 (molar ratio), and thus the polyester resin (A) was synthesized and water-compatibilized.

The amount of the oligomers of the obtained polyester resin aqueous dispersion was measured by GPC and found to be 1.89% by mass. Therefore, no oligomer removal step was conducted. An aqueous coating material was obtained in the same manner as in Example 1. To the aqueous coating material, a methylolated melamine crosslinking agent, Adeka Resin EM-0103 (manufactured by Adeka Corp., solid content concentration: 70% by mass), was added in an amount of 1 part by mass, as an amount substantially giving no crosslinking effect, in relation to 100 parts by mass of the polyester resin. Then, the aqueous coating material was stirred with a homomixer for 2 hours. By using the aqueous coating material having been stirred, a polyester film having a coating layer corresponding to the highly adhesive primer layer was obtained in the same manner as in Example 1.

Example 11

As compared to Example 1, the material feeding conditions were altered so as for a polyester resin (A) to have a composition of terephthalic acid/isophthalic acid/sebacic acid/trimellitic acid/ethylene glycol/1,4-butanediol/neopentyl glycol=61/17/7/15/56/32/13 (molar ratio), and thus the polyester resin (A) was synthesized and water-compatibilized.

The amount of the oligomers of the obtained polyester resin aqueous dispersion was measured by using GPC and found to be 3.58% by mass. Therefore, the polyester resin aqueous dispersion was continuously allowed to stand still until the amount of the oligomers came to be 2% by mass or less. At a still-standing time of 199 hours, the amount of the oligomers was found to be 1.96% by mass. Then, by using the aqueous dispersion thus obtained, an aqueous coating material was prepared. To the aqueous coating material, an isocyanate crosslinking agent, AQ-100 (manufactured by Nippon Polyurethane Industry Co., Ltd., solid content concentration: 100% by mass), was added in an amount of 1 part by mass, as an amount substantially giving no crosslinking effect, in relation to 100 parts by mass of the polyester resin. Then, the aqueous coating material was stirred with a homomixer for 2 hours. By using the aqueous coating material having been stirred, a polyester film having a coating layer corresponding to the highly adhesive primer layer was obtained in the same manner as in Example 1.

Example 12

Both sides of an unstretched film were coated with the already prepared aqueous coating material. Otherwise in the same manner as in Example 1, a polyester film having, on each of both sides thereof, a coating layer corresponding to the highly adhesive primer layer was obtained.

Example 13

In the production of the modified PBT, PTMG650 (manufactured by Mitsubishi Chemical Corp.) having a molecular weight of 650 was used as PTMG, and the relation PBT unit:PTMG unit=95:5 (mass ratio) was effected. In the production of the polyester film, the relation PET/modified PBT=70/30 (mass ratio) was effected. The film was stretched at a magnification of 3.5× with a roll longitudinal stretching machine and at a magnification of 3.0× with a tenter transverse stretching machine and the relaxation rate was set at 1%. Otherwise in the same manner as in Example 1, a polyester film having a coating layer corresponding to the highly adhesive primer layer was obtained.

Example 14

In the production of the modified PBT, PTMG3000 (manufactured by Mitsubishi Chemical Corp.) having a molecular weight of 3000 was used as PTMG, and the relation PBT unit:PTMG unit=70:30 (mass ratio) was effected. In the production of the polyester film, the relation PET/modified PBT=90/10 (mass ratio) was effected. The film was stretched at a magnification of 3.5× with a roll longitudinal stretching machine and at a magnification of 3.2× with a tenter transverse stretching machine and the relaxation rate was set at 5%. Otherwise in the same manner as in Example 1, a polyester film having a coating layer corresponding to the highly adhesive primer layer was obtained.

Comparative Examples 1 To 5

For the same polyester resin aqueous dispersions as used in Examples 5 to 9, no oligomer removal step was conducted. By coating polyester films respectively with the aqueous coating materials thus obtained in the same manner as in Example 1, polyester films each having a coating layer corresponding to the highly adhesive primer layer were prepared.

Comparative Example 6

As compared to Example 1, the material feeding conditions were altered so as for a polyester resin (A) to have a composition of terephthalic acid/isophthalic acid/abscisic acid/trimellitic acid/ethylene glycol/neopentyl glycol=55/30/13/2/50/50 (molar ratio), and thus the polyester resin (A) was synthesized and water-compatibilized. The oligomers were removed in the same manner as in Example 5 to yield an aqueous coating material containing the polyester having a predetermined oligomer amount. By using the aqueous coating material, a polyester film having a coating layer corresponding to the highly adhesive primer layer was obtained in the same manner as in Example 1.

Comparative Example 7

For the same polyester resin aqueous dispersion as used in Comparative Example 6, no oligomer removal step was conducted. By coating a polyester film with the aqueous coating material thus obtained in the same manner as in Example 1, a polyester film having a coating layer corresponding to the highly adhesive primer layer was prepared.

Comparative Example 8

To the aqueous coating material used in Example 5, a methylolated melamine crosslinking agent, Adeka Resin EM-0103 (manufactured by Adeka Corp., solid content concentration: 70% by mass), was added as a crosslinking agent in an amount of 15 parts by mass in relation to 100 parts by mass of the polyester resin. Then, the aqueous coating material was stirred with a homomixer for 2 hours. The liquid product thus obtained was used as an aqueous coating material. Otherwise in the same manner as in Example 1, a polyester film having a coating layer corresponding to the highly adhesive primer layer was prepared.

Comparative Example 9

The crosslinking agent added to the aqueous coating material was altered to an isocyanate crosslinking agent, AQ-100 (manufactured by Nippon Polyurethane Industry Co., Ltd., solid content concentration: 100% by mass). Otherwise in the same manner as in Comparative Example 8, a polyester film having a coating layer corresponding to the highly adhesive primer layer was prepared.

Comparative Example 10

As compared to Example 1, the material feeding conditions were altered so as for a polyester resin (A) to have a composition of terephthalic acid/isophthalic acid/trimellitic acid/5-sulfoisophthalic acid/ethylene glycol/diethylene glycol=61/31/3/5/23/77 (molar ratio), and thus the polyester resin (A) was synthesized and water-compatibilized. The oligomers were removed in the same manner as in Example 5 to yield an aqueous coating material containing the polyester having a predetermined oligomer amount. By using the aqueous coating material, a polyester film having a coating layer corresponding to the highly adhesive primer layer was obtained in the same manner as in Example 1.

Comparative Example 11

As compared to Example 1, the material feeding conditions were altered so as for a polyester resin (A) to have a composition of terephthalic acid/isophthalic acid/trimellitic acid/5-sulfoisophthalic acid/ethylene glycol/diethylene glycol=61/33/1/5/52/48 (molar ratio), and thus the polyester resin (A) was synthesized and water-compatibilized. The oligomers were removed in the same manner as in Example 5 to yield an aqueous coating material containing the polyester having a predetermined oligomer amount. By using the aqueous coating material, a polyester film having a coating layer corresponding to the highly adhesive primer layer was obtained in the same manner as in Example 1.

Comparative Example 12

In the production of the polyester film, the relation PET/modified PBT=100/0 (mass ratio) was effected. The longitudinal stretching magnification was set at 3.4×, the transverse magnification was set at 3.2× and the relaxation rate was set at 2%. Otherwise in the same manner as in Example 1, a polyester film having a coating layer corresponding to the highly adhesive primer layer was obtained.

Reference Example

As compared to Example 1, a substrate polyester film was biaxially stretched without being coated with an aqueous coating material to yield a 12-μm thick biaxially stretched polyester film. The film thus obtained was subjected to the evaluations of the linear tearability and the tear resistance, without being subjected to a retorting treatment, and consequently, the linear tearability was marked with E and the tear resistance was also marked with E. The same film was subjected to a retorting treatment at 120° C. for 30 minutes or at 135° C. for 30 minutes, and then the above-described evaluations were performed again; consequently, the linear tearability was marked with E and the tear resistance was also marked with E in a manner independent of the retorting treatment conditions. In other words, in the substrate polyester film alone, no effect of the retorting treatment on the opening performance was found.

Table 1 shows the evaluation results of Examples 1 to 14, and Table 2 shows the evaluation results of Comparative Examples 1 to 12.

TABLE 1

| | | Highly adhesive coating layer | | | | | | | | |
|---|---|---|---|---|---|---|---|---|---|---|
| | | Aqueous coating material | | | | | | | | |
| | | Acid number (mgKOH/g) | Hydroxyl number (mgKOH/g) | Acid number + hydroxyl number | Oligomer amount (% by mass) | Film thickness (μm) | Surface carboxylic acid concentration [COOH]/[C] | Surface hydroxyl concentration [OH]/[C] | Surface amine concentration [$NH_2$]/[C] | Laminated film Configuration |
| Examples | 1 | 25.1 | 81.2 | 106.3 | 1.32 | 0.04 | 0.0055 | 0.0150 | <0.0000 | PET/CPP PET/Al/CPP |
| | 2 | 24.5 | 115.1 | 139.6 | 0.85 | 0.04 | 0.0052 | 0.0200 | <0.0000 | PET/CPP PET/Al/CPP |
| | 3 | 26.4 | 63.9 | 90.3 | 1.22 | 0.04 | 0.0061 | 0.0135 | <0.0000 | PET/CPP PET/Al/CPP |
| | 4 | 35.1 | 130.1 | 165.2 | 0.56 | 0.04 | 0.0051 | 0.0213 | <0.0000 | PET/CPP PET/Al/CPP |
| | 5 | 53.7 | 49.2 | 102.9 | 0.40 | 0.04 | 0.0108 | 0.0110 | <0.0000 | PET/CPP PET/Al/CPP |
| | 6 | 39.0 | 32.0 | 71.0 | 0.87 | 0.04 | 0.0086 | 0.0071 | <0.0000 | PET/CPP PET/Al/CPP |
| | 7 | 42.1 | 45.3 | 87.4 | 0.17 | 0.04 | 0.0101 | 0.0113 | <0.0000 | PET/CPP PET/Al/CPP |
| | 8 | 33.5 | 32.4 | 65.9 | 1.54 | 0.04 | 0.0084 | 0.0079 | <0.0000 | PET/CPP PET/Al/CPP |
| | 9 | 31.3 | 35.1 | 66.4 | 1.46 | 0.04 | 0.0077 | 0.0065 | <0.0000 | PET/CPP PET/Al/CPP |

TABLE 1-continued

| | | Acid number (mgKOH/g) | Hydroxyl number (mgKOH/g) | Acid number + hydroxyl number | Oligomer amount (% by mass) | Film thickness (μm) | Surface carboxylic acid concentration [COOH]/[C] | Surface hydroxyl concentration [OH]/[C] | Surface amine concentration [NH$_2$]/[C] | Laminated film Configuration |
|---|---|---|---|---|---|---|---|---|---|---|
| | 10 | 20.5 | 146.9 | 167.4 | 1.89 | 0.10 | 0.0045 | 0.0250 | 0.0002 | PET/CPP PET/Al/CPP |
| | 11 | 59.7 | 30.1 | 89.8 | 1.96 | 0.20 | 0.0160 | 0.0295 | 0.0001 | PET/CPP PET/Al/CPP |
| | 12 | 25.1 | 81.2 | 106.3 | 1.32 | 0.04 | 0.0055 | 0.0150 | <0.0000 | PET/CPP PET/Al/CPP |
| | 13 | 25.1 | 81.2 | 106.3 | 1.32 | 0.04 | 0.0055 | 0.0150 | <0.0000 | PET/CPP PET/Al/CPP |
| | 14 | 25.1 | 81.2 | 106.3 | 1.32 | 0.04 | 0.0055 | 0.0150 | <0.0000 | PET/CPP PET/Al/CPP |

Laminated film

| | | Properties before retorting treatment | | | | Properties after retorting treatment | | | | | | | |
|---|---|---|---|---|---|---|---|---|---|---|---|---|---|
| | | | | | | 120° C. × 30 min | | | | 135° C. × 30 min | | | |
| | | Opening performance (*) | | Laminate strength | | Opening performance (*) | | Laminate strength | | Opening performance (*) | | Laminate strength | |
| | | | | | | | | | | | | | |
| | | ① | ② | Ordinary condition | Water-wetted condition | ① | ② | Ordinary condition | Water-wetted condition | ① | ② | Ordinary condition | Water-wetted condition |
| Examples | 1 | E (1) | E | E (≥400) | E (≥400) | E (2) | E | E (≥400) | E (≥400) | E (3) | E | E (≥400) | E (≥400) |
| | | E (3) | E | E (≥400) | E (≥400) | E (2) | E | E (≥400) | G (360) | E (2) | E | E (≥400) | G (320) |
| | 2 | E (2) | E | E (≥400) | E (≥400) | E (2) | E | E (≥400) | E (≥400) | E (1) | E | E (≥400) | E (≥400) |
| | | E (2) | E | E (≥400) | G (390) | E (4) | E | E (≥400) | G (340) | G (6) | G | G (320) | G (300) |
| | 3 | E (0) | E | E (≥400) | E (≥400) | E (3) | E | E (≥400) | E (≥400) | E (2) | E | E (≥400) | E (≥400) |
| | | E (2) | E | E (≥400) | G (370) | E (1) | E | E (≥400) | G (390) | E (5) | E | G (390) | G (320) |
| | 4 | E (2) | E | E (≥400) | E (≥400) | E (2) | E | E (≥400) | G (310) | E (3) | E | E (≥400) | G (350) |
| | | E (2) | E | E (≥400) | G (390) | E (1) | E | E (≥400) | G (330) | E (4) | E | G (310) | G (300) |
| | 5 | E (1) | E | E (≥400) | G (380) | E (2) | E | E (≥400) | G (350) | E (2) | E | E (≥400) | E (≥400) |
| | | E (2) | E | E (≥400) | E (≥400) | E (5) | E | G (340) | G (310) | E (4) | E | G (330) | G (310) |
| | 6 | E (1) | E | E (≥400) | E (≥400) | E (1) | E | G (330) | A (290) | E (2) | G | E (≥400) | G (310) |
| | | E (3) | G | E (≥400) | E (≥400) | E (3) | G | G (350) | A (210) | G (8) | G | E (≥400) | A (200) |
| | 7 | E (2) | E | E (≥400) | E (≥400) | E (2) | E | E (≥400) | E (≥400) | G (6) | G | E (≥400) | G (390) |
| | | E (1) | E | E (≥400) | G (390) | E (3) | E | E (≥400) | G (390) | E (3) | E | G (380) | G (360) |
| | 8 | E (2) | E | E (≥400) | G (370) | E (2) | E | E (≥400) | E (≥400) | E (2) | E | E (≥400) | E (≥400) |
| | | E (2) | E | E (≥400) | G (370) | E (2) | E | E (≥400) | G (350) | E (3) | E | E (≥400) | G (310) |
| | 9 | E (2) | E | E (≥400) | E (≥400) | E (3) | E | E (≥400) | G (310) | E (2) | E | E (≥400) | G (330) |
| | | E (3) | E | E (≥400) | E (≥400) | E (5) | E | G (320) | G (300) | G (6) | G | G (330) | A (260) |
| | 10 | E (2) | E | E (≥400) | E (≥400) | E (2) | E | E (≥400) | E (≥400) | E (3) | E | E (≥400) | E (≥400) |
| | | E (3) | E | E (≥400) | E (≥400) | E (2) | E | E (≥400) | G (310) | E (2) | E | G (360) | A (290) |
| | 11 | E (3) | E | E (≥400) | E (≥400) | E (2) | E | E (≥400) | E (≥400) | E (3) | E | E (≥400) | E (≥400) |
| | | E (3) | E | E (≥400) | E (≥400) | E (2) | E | E (≥400) | G (330) | E (2) | E | G (350) | G (320) |
| | 12 | E (2) | E | E (≥400) | E (≥400) | E (2) | E | E (≥400) | E (≥400) | E (2) | E | E (≥400) | E (≥400) |
| | | E (2) | E | E (≥400) | E (≥400) | E (2) | E | E (≥400) | G (360) | E (2) | E | G (390) | G (340) |
| | 13 | E (1) | E | E (≥400) | E (≥400) | E (2) | E | E (≥400) | E (≥400) | E (2) | E | E (≥400) | E (≥400) |
| | | E (2) | E | E (≥400) | E (≥400) | E (2) | E | E (≥400) | G (390) | E (2) | E | G (350) | G (330) |
| | 14 | E (2) | E | E (≥400) | E (≥400) | E (2) | E | E (≥400) | E (≥400) | E (3) | E | E (≥400) | E (≥400) |
| | | E (3) | E | E (≥400) | E (≥400) | E (2) | E | E (≥400) | G (350) | E (3) | E | G (360) | G (300) |

(*) In the columns of the opening performance, ① stands for the linear tearability and ② stands for the tear resistance.

TABLE 2

| | | Highly adhesive coating layer | | | | | | | | |
|---|---|---|---|---|---|---|---|---|---|---|
| | | Aqueous coating material | | | | | | | | |
| | | Acid number (mgKOH/g) | Hydroxyl number (mgKOH/g) | Acid number + hydroxyl number | Oligomer amount (% by mass) | Film thickness (μm) | Surface carboxylic acid concentration [COOH]/[C] | Surface hydroxyl concentration [OH]/[C] | Surface amine concentration [NH$_2$]/[C] | Laminated film Configuration |
| Comparative Examples | 1 | 53.7 | 49.2 | 102.9 | 3.58 | 0.04 | 0.0043 | 0.0041 | <0.0000 | PET/CPP PET/Al/CPP |
| | 2 | 39.0 | 32.0 | 71.0 | 2.73 | 0.04 | 0.0025 | 0.0019 | <0.0000 | PET/CPP PET/Al/CPP |
| | 3 | 42.1 | 45.3 | 87.4 | 2.14 | 0.04 | 0.0037 | 0.0041 | <0.0000 | PET/CPP PET/Al/CPP |
| | 4 | 33.5 | 32.4 | 65.9 | 3.72 | 0.04 | 0.0023 | 0.0025 | <0.0000 | PET/CPP PET/Al/CPP |
| | 5 | 31.3 | 29.8 | 61.1 | 3.25 | 0.04 | 0.0031 | 0.0029 | <0.0000 | PET/CPP PET/Al/CPP |
| | 6 | 18.8 | 11.1 | 29.9 | 1.24 | 0.04 | 0.0053 | 0.0048 | <0.0000 | PET/CPP PET/Al/CPP |

TABLE 2-continued

| | | | | | | | | | |
|---|---|---|---|---|---|---|---|---|---|
| 7 | 18.8 | 11.1 | 29.9 | 4.22 | 0.04 | 0.0035 | 0.0032 | <0.0000 | PET/CPP PET/Al/CPP |
| 8 | 53.7 | 49.2 | 102.9 | 0.40 | 0.04 | 0.0099 | 0.0095 | 0.0025 | PET/CPP PET/Al/CPP |
| 9 | 53.7 | 49.2 | 102.9 | 0.40 | 0.04 | 0.0100 | 0.0103 | 0.0018 | PET/CPP PET/Al/CPP |
| 10 | 16.8 | 14.2 | 31.0 | 1.35 | 0.04 | 0.0023 | 0.0025 | <0.0000 | PET/CPP PET/Al/CPP |
| 11 | 7.9 | 18.1 | 26.0 | 1.21 | 0.04 | 0.0015 | 0.0031 | <0.0000 | PET/CPP PET/Al/CPP |
| 12 | 25.1 | 81.2 | 26.0 | 1.32 | 0.04 | 0.0055 | 0.0150 | <0.0000 | PET/CPP PET/Al/CPP |

Laminated film

| | | Properties before retorting treatment | | | Properties after retorting treatment | | | | | | | |
|---|---|---|---|---|---|---|---|---|---|---|---|---|
| | | | | | 120° C. × 30 min | | | | 135° C. × 30 min | | | |
| | | | | Laminate strength | | | | Laminate strength | | | | Laminate strength |
| | | Opening performance (*) | | Ordinary condition | Water-wetted condition | Opening performance (*) | | Ordinary condition | Water-wetted condition | Opening performance (*) | | Ordinary condition | Water-wetted condition |
| | | ① | ② | | | ① | ② | | | ① | ② | | |
| Comparative Examples | 1 | E (1) | E | E (≥400) | G (390) | E (4) | E | E (≥400) | A (230) | P (21) | A | P (110) | P (<100) |
| | | E (3) | G | E (≥400) | E (≥400) | G (7) | A | G (260) | A (220) | P (37) | P | P (<100) | P (100) |
| | 2 | E (2) | E | E (≥400) | E (≥400) | G (8) | G | E (≥400) | A (200) | P (16) | P | P (<100) | P (<100) |
| | | E (2) | E | E (≥400) | E (≥400) | A (16) | A | G (270) | P (190) | P (19) | P | P (<100) | P (<100) |
| | 3 | E (1) | E | E (≥400) | E (≥400) | E (3) | G | E (≥400) | A (270) | A (14) | P | A (210) | P (130) |
| | | E (1) | E | E (≥400) | E (≥400) | G (7) | A | P (160) | A (210) | P (25) | P | P (<100) | P (<100) |
| | 4 | E (1) | E | E (≥400) | E (≥400) | E (3) | E | E (≥400) | A (260) | A (17) | A | A (200) | P (<100) |
| | | E (2) | E | E (≥400) | G (390) | E (5) | G | E (≥400) | P (110) | P (42) | P | P (160) | P (<100) |
| | 5 | E (1) | E | E (≥400) | G (380) | G (13) | G | G (240) | P (180) | P (31) | P | P (130) | P (140) |
| | | E (1) | E | E (≥400) | E (≥400) | A (16) | A | P (190) | A (200) | P (18) | P | P (<100) | P (<100) |
| | 6 | E (2) | E | E (≥400) | E (≥400) | P (25) | P | P (190) | P (100) | P (27) | P | P (<100) | P (<100) |
| | | E (2) | E | E (≥400) | E (≥400) | P (26) | A | P (170) | P (<100) | P (19) | P | P (<100) | P (<100) |
| | 7 | E (1) | E | E (≥400) | E (≥400) | P (19) | P | A (290) | A (210) | P (35) | P | P (100) | P (<100) |
| | | E (2) | E | E (≥400) | E (≥400) | P (32) | A | P (130) | P (110) | P (43) | P | P (<100) | P (<100) |
| | 8 | E (0) | E | E (≥400) | E (≥400) | A (15) | A | A (270) | A (220) | P (32) | P | P (120) | P (<100) |
| | | E (3) | G | E (≥400) | G (350) | P (26) | P | P (180) | P (120) | P (18) | P | P (<100) | P (<100) |
| | 9 | E (1) | E | E (≥400) | E (≥400) | P (31) | P | A (240) | A (200) | P (20) | P | P (<100) | P (<100) |
| | | E (3) | G | E (≥400) | G (300) | P (17) | P | P (190) | P (<100) | P (33) | P | P (<100) | P (<100) |
| | 10 | E (2) | E | E (≥400) | E (≥400) | G (9) | P | E (≥400) | P (160) | P (25) | P | P (130) | P (<100) |
| | | E (2) | E | E (≥400) | E (≥400) | P (19) | A | P (190) | P (100) | P (29) | P | P (<100) | P (<100) |
| | 11 | E (0) | E | E (≥400) | E (≥400) | P (32) | P | P (140) | P (100) | P (36) | P | P (<100) | P (<100) |
| | | E (1) | E | E (≥400) | E (≥400) | P (26) | P | P (100) | P (<100) | P (30) | P | P (<100) | P (<100) |
| | 12 | P (25) | E | E (≥400) | G (390) | P (19) | E | E (≥400) | E (≥400) | P (21) | E | E (≥400) | E (≥400) |
| | | P (30) | G | E (≥400) | E (≥400) | P (25) | E | E (≥400) | G (380) | P (35) | E | G (360) | G (320) |

(*) In the columns of the opening performance, ① stands for the linear tearability and ② stands for the tear resistance.

It is to be noted that the highly adhesive polyester film is a film mainly composed of a substrate film, and the substrate film is a resin film mainly composed of PET, and hence in the column for the configuration under the heading of the laminated film in Table 1, the highly adhesive polyester film is simply denoted by "PET."

As can be seen from Table 1, in each of Examples, the acid number and the hydroxyl number met the ranges specified in the present invention, and the oligomer amount was 2.0% by mass or less, and additionally, by forming on the surface of the substrate film a coating layer serving as the highly adhesive primer layer by use of the polyester resin (A) substantially containing no crosslinking agent component, practically sufficient laminate strength and opening performance were maintained even after the retorting treatment either at 120° C. for 30 minutes or at 135° C. for 30 minutes, both under ordinary condition and under water-wetted condition.

Irrespective of under ordinary condition or under water-wetted condition, the film of each of Examples maintained high-level adhesiveness even after severe retorting treatment owing to disposing a highly adhesive primer layer using the polyester resin (A) on the substrate film formed of a biaxially stretched polyester film intrinsically having easy tearability. Therefore, when a packaging bag was opened, no delamination was caused, and accordingly the linear tearability of the substrate polyester film was sufficiently displayed to enable linear opening to be smoothly performed.

Additionally, the film each of Examples did not need the use of any crosslinking agent in the highly adhesive primer layer, and hence did not pollute the environment with by-products at the time of production of the packaging material and enabled to maintain the work environment under comfortable conditions.

On the contrary, Comparative Examples offered the following problems.

In each of Comparative Examples 1 to 4, no crosslinking agent component was contained, the acid number and the hydroxyl number of the polyester resin met the ranges specified in the present invention, but the amount of the oligomers contained in the polyester resin exceeded the range specified in the present invention. In Comparative Example 5, no crosslinking agent component was contained, the acid number of the polyester resin met the range specified in the present invention, but the hydroxyl number of the polyester resin did not meet the range specified in the present invention, and the amount of the oligomers contained in the polyester resin exceeded the range specified in the present invention. Consequently, some of Comparative Examples 1 to 5 maintained the laminate strength and the linear tearability under the retorting conditions that the temperature was 120° C. and the treating time was 30 minutes, but in any one of Comparative Examples 1 to 5, the laminate strength was degraded and the linear tearability was also poor under the more severe retorting conditions that the temperature was 135° C. and the treating time was 30 minutes, irrespective of under ordinary condition or under water-wetted condition.

In Comparative Example 6, the amount of the oligomers contained in the polyester resin met the range specified in the present invention, but the sum of the acid number and the hydroxyl number of the polyester resin was smaller than the range specified in the present invention. Therefore, already under the retorting conditions that the temperature was 120° C. and the treating time was 30 minutes, the opening performance and the laminate strength were found to be drastically degraded, and under the retorting conditions that the temperature was 135° C. and the treating time was 30 minutes, the laminate strength was further degraded.

In Comparative Example 7, the sum of the acid number and the hydroxyl number of the aqueous polyester resin and the amount of the oligomers contained in the aqueous polyester resin fell outside the ranges specified in the present invention. In each of Comparative Examples 8 and 9, a melamine crosslinking agent or an isocyanate crosslinking agent was added to the aqueous coating material. In each of Comparative Examples 10 and 11, the amount of the oligomers contained in the aqueous polyester resin met the range specified in the present invention, but the acid number of the aqueous polyester resin did not meet the range specified in the present invention. Consequently, in any of Comparative Examples 7 to 11, the opening performance and the laminate strength both being satisfactory before the retorting treatment were found to be degraded after the treatment at 120° C. for 30 minutes, and both of the opening performance and the laminate strength after the treatment at 135° C. for 30 minutes were evaluated not to maintain practical performances.

In Comparative Example 12, only a common PET film having no linear tearability was used, and consequently, the laminate strength due to the highly adhesive coating was not found to be degraded in performance even after the retorting treatment, but the liner tearability was not developed.

The invention claimed is:

1. An adhesive polyester film having an adhesive primer layer disposed on at least one side of a substrate polyester film, wherein:
the substrate polyester film is a stretched film having linear tearability and formed of a mixed polyester resin containing polyethylene terephthalate and a modified polybutylene terephthalate;
the adhesive primer layer contains a polyester resin (A) and a crosslinking agent component content of 0.1% by mass or less, and has a thickness of 0.5 μm or less; and
the polyester resin (A) in the adhesive primer layer contains a polybasic acid component and an alcohol component, the polybasic acid component including 40 mol % or more of an aromatic dicarboxylic acid and the alcohol component including 50 mol % or more of a diol, and the polyester resin (A) having an acid number of 20 to 60 mg KOH/g, a hydroxyl number of 30 to 150 mg KOH/g, an oligomer content of 2.0% by mass or less, and a number average molecular weight of 2000 to 5000.

2. The adhesive polyester film according to claim 1, wherein in the polyester resin (A), a sum of the acid number and the hydroxyl number is 50 to 200 mg KOH/g.

3. The adhesive polyester film according to claim 1, wherein in the polyester resin (A), a ratio of the hydroxyl number to the acid number, (hydroxyl number)/(acid number), is 2.0 to 5.0.

4. The adhesive polyester film according to claim 1, wherein in the adhesive primer layer, a surface carboxylic acid concentration and a surface hydroxyl concentration are each 0.005 or more, and a surface primary amine concentration is 0.0061 or less.

5. The adhesive polyester film according to claim 1, wherein the crosslinking agent component contained at the content of 0.1% by mass or less is a melamine compound.

6. The adhesive polyester film according to claim 1, wherein the modified polybutylene terephthalate in the substrate film contains polybutylene terephthalate and polytetramethylene glycol.

7. A method for producing an adhesive polyester film, the method being a method for producing the adhesive polyester film according to claim 1, wherein a coating layer is formed by applying an aqueous coating material composed of the polyester resin (A) to at least one side of the substrate polyester film before orientational crystallization, and then the substrate polyester film is orientationally crystallized by stretching in at least one direction and heat treating the substrate polyester film together with the coating layer.

8. The method for producing an adhesive polyester film according to claim 7, wherein an oligomer removal treatment is performed.

9. A laminated film comprising the adhesive polyester film according to claim 1.

10. The laminated film according to claim 9, wherein the adhesive polyester film and another layer are made to adhere to each other through the intermediary of a polyurethane adhesive.

11. The laminated film according to claim 9, wherein a laminate strength of the laminated film after a retorting treatment at 135° C. for 30 minutes is 200 g/15 mm width or more under either ordinary condition or water-wetted conditions.

12. A packaging bag wherein the bag is made of the laminated film according to claim 9.

13. The packaging bag according to claim 12, wherein the bag is made in such a way that the linear tearing direction of the laminated film coincides with an opening direction of the bag.

* * * * *